June 28, 1966 G. P. SHIMMIN 3,258,269

MAGNETIC RECORDING APPARATUS

Filed Sept. 30, 1963 7 Sheets-Sheet 1

INVENTOR
George P. Shimmin
BY Kemon, Palmer, Stewart & Estabrook
ATTORNEY

MAGNETIC RECORDING APPARATUS

Filed Sept. 30, 1963 7 Sheets-Sheet 2

INVENTOR
George P. Shimmin
BY Kemon, Palmer, Stewart & Estabrook
ATTORNEYS

June 28, 1966 G. P. SHIMMIN 3,258,269

MAGNETIC RECORDING APPARATUS

Filed Sept. 30, 1963 7 Sheets-Sheet 3

INVENTOR

George P. Shimmin

BY Kemon Palmer, Stewart & Estabrook

ATTORNEYS

June 28, 1966 G. P. SHIMMIN 3,258,269

MAGNETIC RECORDING APPARATUS

Filed Sept. 30. 1963 7 Sheets-Sheet 4

INVENTOR

George P. Shimmin

BY Kemon, Palmer, Stewart & Estabrook

ATTORNEYS

INVENTOR
George P. Shimmin
BY Kemon, Palmer, Stewart & Estabrook
ATTORNEYS

INVENTOR
George P. Shimmin
BY Kemon, Palmer, Stewart & Estabrook
ATTORNEYS

INVENTOR
George P. Shimmin
BY Kemon, Palmer, Stewart & Estabrook
ATTORNEYS 3,258,269
MAGNETIC RECORDING APPARATUS George Pattinson Shimmin, Walton-on-Thames, Surrey, England, assignor to Clarke & Smith Office Equipment Limited, High Holborn, W.C. 1, England, a British company Filed Sept. 30, 1963, Ser. No. 312,777
Claims priority, application Great Britain, Oct. 1, 1962, 37,168/62, 37,169/62; Nov. 22, 1962, 44,159/62
27 Claims. (Cl. 274—4)

Figure 1:
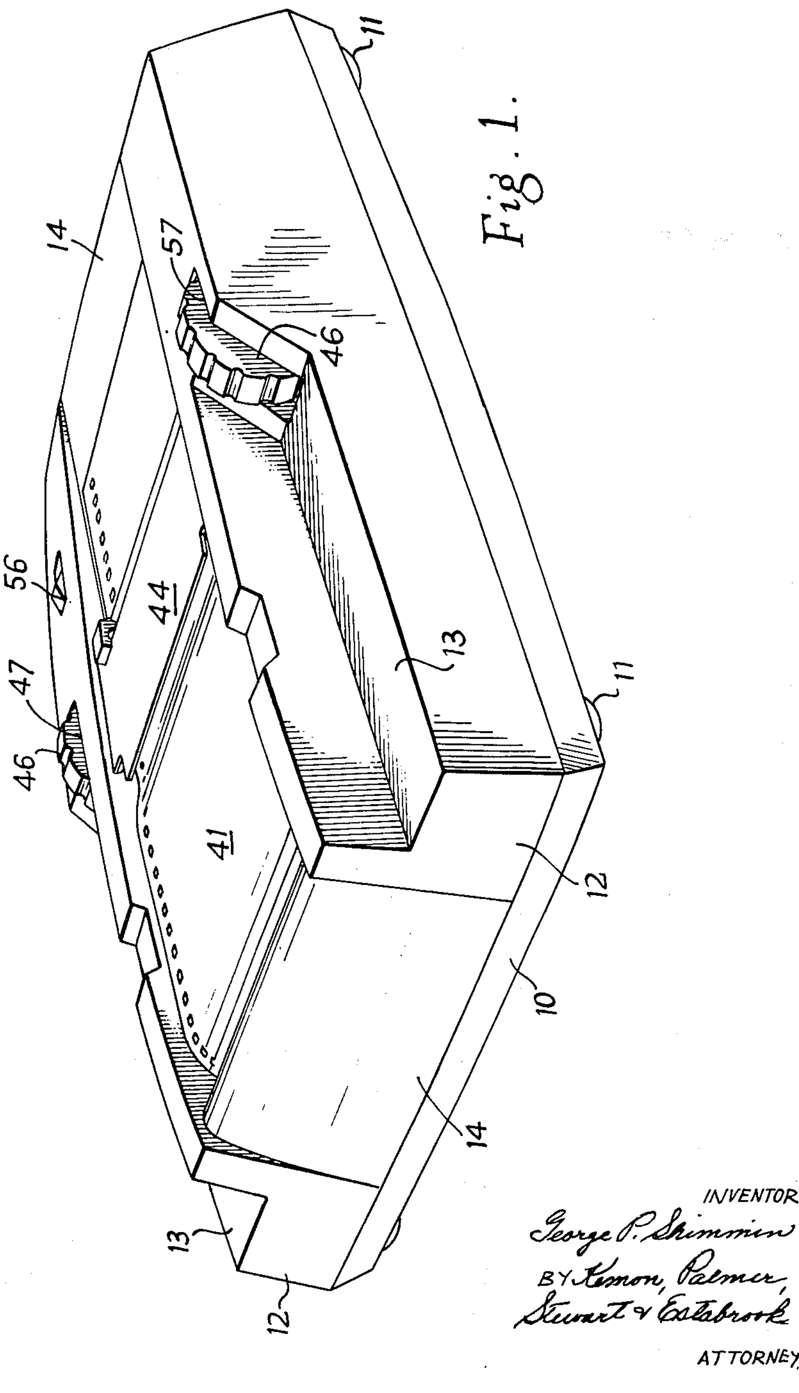

The present invention relates to apparatus for use in the magnetic recording, or reproduction, or both, of sound, particularly, but not exclusively, speech.

Apparatus suitable for recording sound has been proposed including a plurality of magnetic recording heads mounted for rotation in a common plane about a common axis and equally spaced angularly from one another about the axis of rotation and band-feeding mechanism adapted so to feed a recording medium of band form past the heads in a plane parallel to the plane of rotation of the heads that recording can be effected along a series of arcuate tracks in turn, the tracks extending across the band and being spaced from each other along the band. It has been proposed to use three recording heads in such an arrangement, the heads being mounted upon a disc, wheel or the like (hereinafter referred to as the head platform) so journalled in a frame as to lie in a horizontal plane when in normal use.

Such apparatus would enable a broad band, for example four inches in width, to be employed whereby the length of band used for a recording would be much shorter than is required with the conventional narrow tape. To carry a recording of a dictated letter only a few inches of band would normally be required and for use in dictation of letters the band could be cheap and have a paper or the like base whereby it could be destroyed after transcription.

As is usual the same apparatus could be used for recording and reproducing the sound by employing suitable switching and amplifying devices.

According to the present invention apparatus suitable for recording sound includes a plurality of magnetic recording heads mounted for rotation in a common plane about a common axis and equally spaced angularly from one another about the axis of rotation and band-feeding mechanism for so feeding a recording medium of band form past the heads in a plane parallel to the plane of rotation of the heads that recording can be effected along a series of arcuate tracks in turn, the tracks extending across the band and being spaced from each other along the band, characterised in that the band-feeding mechanism comprises a worm on a cylindrical outer surface of a platform carrying the recording heads and a wormwheel the teeth of which engage the worm, the worm wheel being mounted on a shaft parallel to the plane of rotation of the heads and at right angles to the direction of motion of the recording band and having one or more sprockets thereon to engage sprocket holes appropriately located in the band for applying traction to the band.

Further according to the present invention apparatus suitable for recording sound includes a plurality of magnetic recording heads mounted for rotation in a common plane about a common axis and equally spaced angularly from one another about the axis of rotation and band-feeding mechanism adapted so to feed a recording medium of band form past the heads in a plane parallel to the plane of rotation of the heads that recording can be effected along a series of arcuate tracks in turn, the tracks extending across the band and being spaced from each other along the band, characterised in that the band-feeding mechanism comprises a band-supporting plate having a first portion inclined with respect to the plane of rotation of the heads, joining a flat second portion of the band-supporting plate the general plane of which is parallel to the said plane of rotation, the second portion of the band-supporting plate having an arcuate slot therethrough of which the extremities extend into the said first portion, the said first portion of the band-supporting plate being inclined in a direction such that the extremities of the slot are inclined away from the said plane of rotation, drive mechanism being provided for drawing the recording head along the band-supporting plate and over the slot, and the arrangement being such that the heads, upon rotation, in turn progressively enter the slot at one inclined extremity to engage the band, and after traversing the band to progressively withdraw from the slot at the other inclined extremity to disengage from the band, the slot being of a length such that the progressive disengagement of each head from the band is accompanied by the progressive engagement of the next succeeding head with the band.

Figure 2:
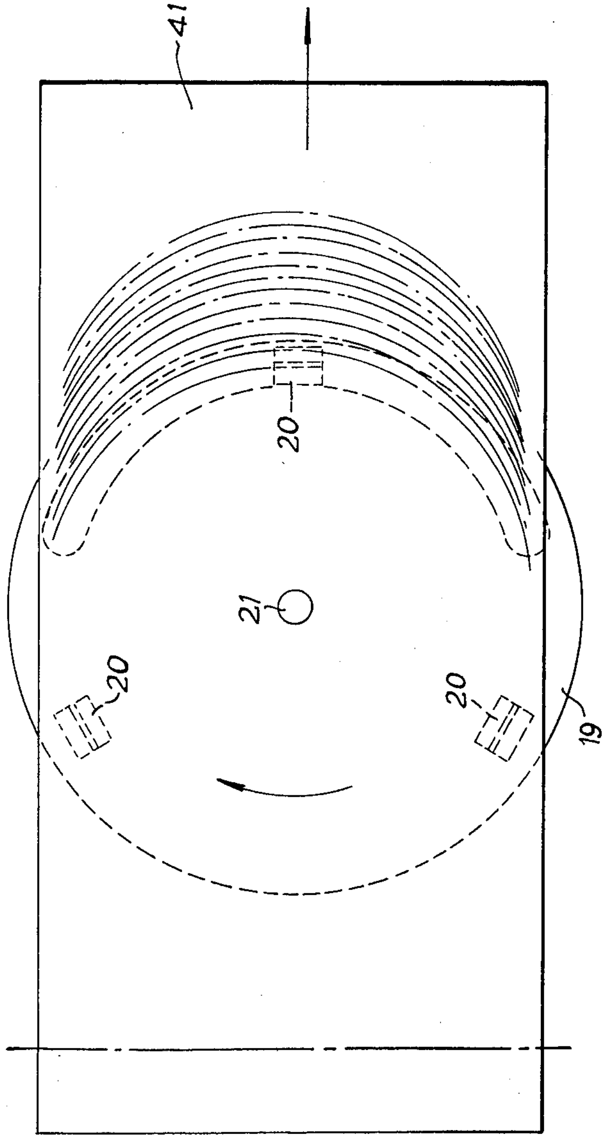
Figure 3:
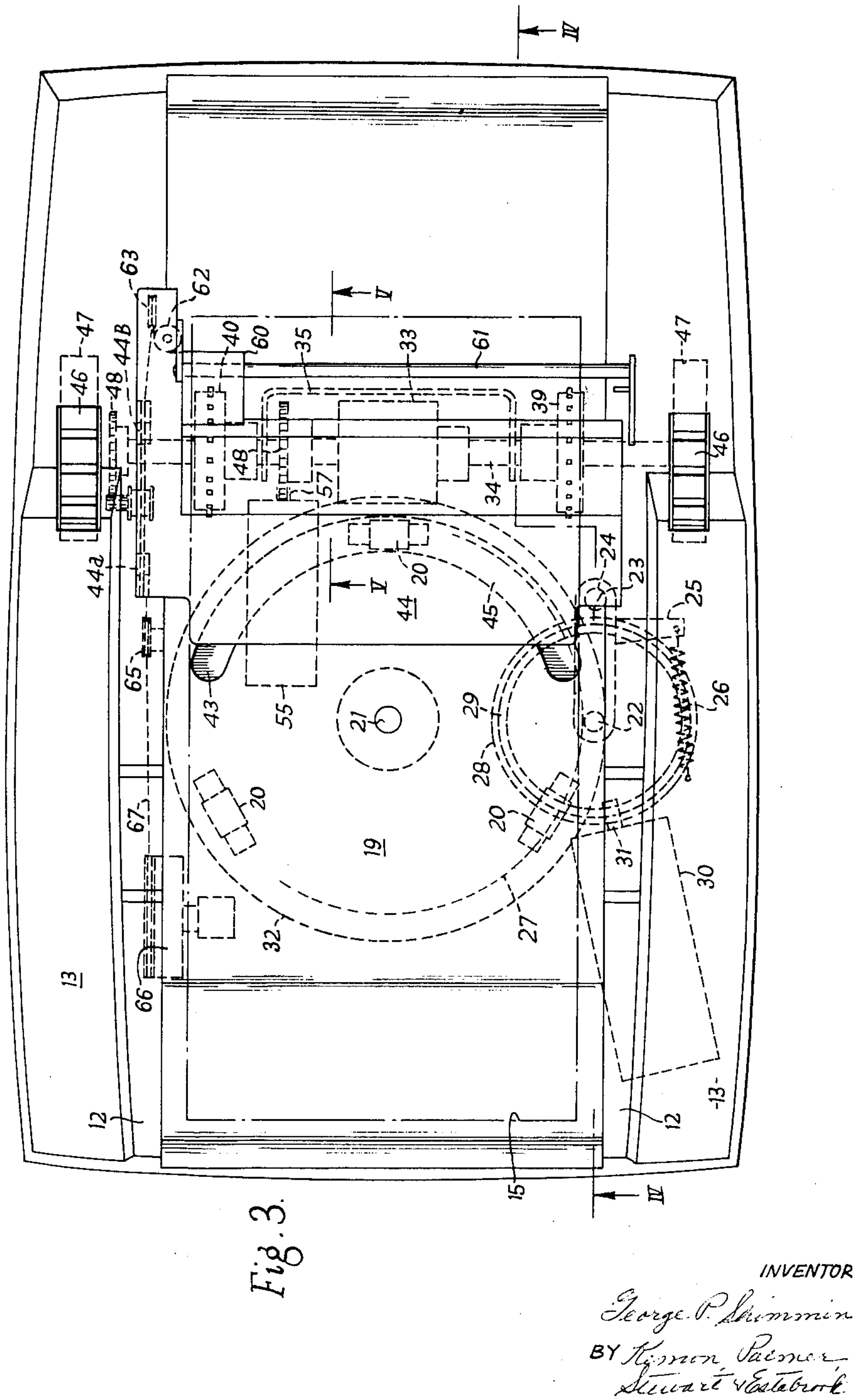
Figure 4:
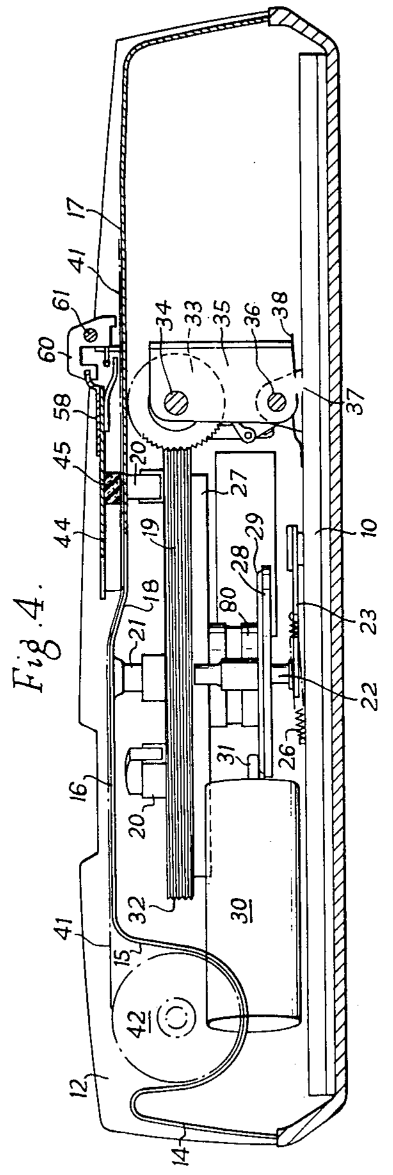
Figures 5, 7:
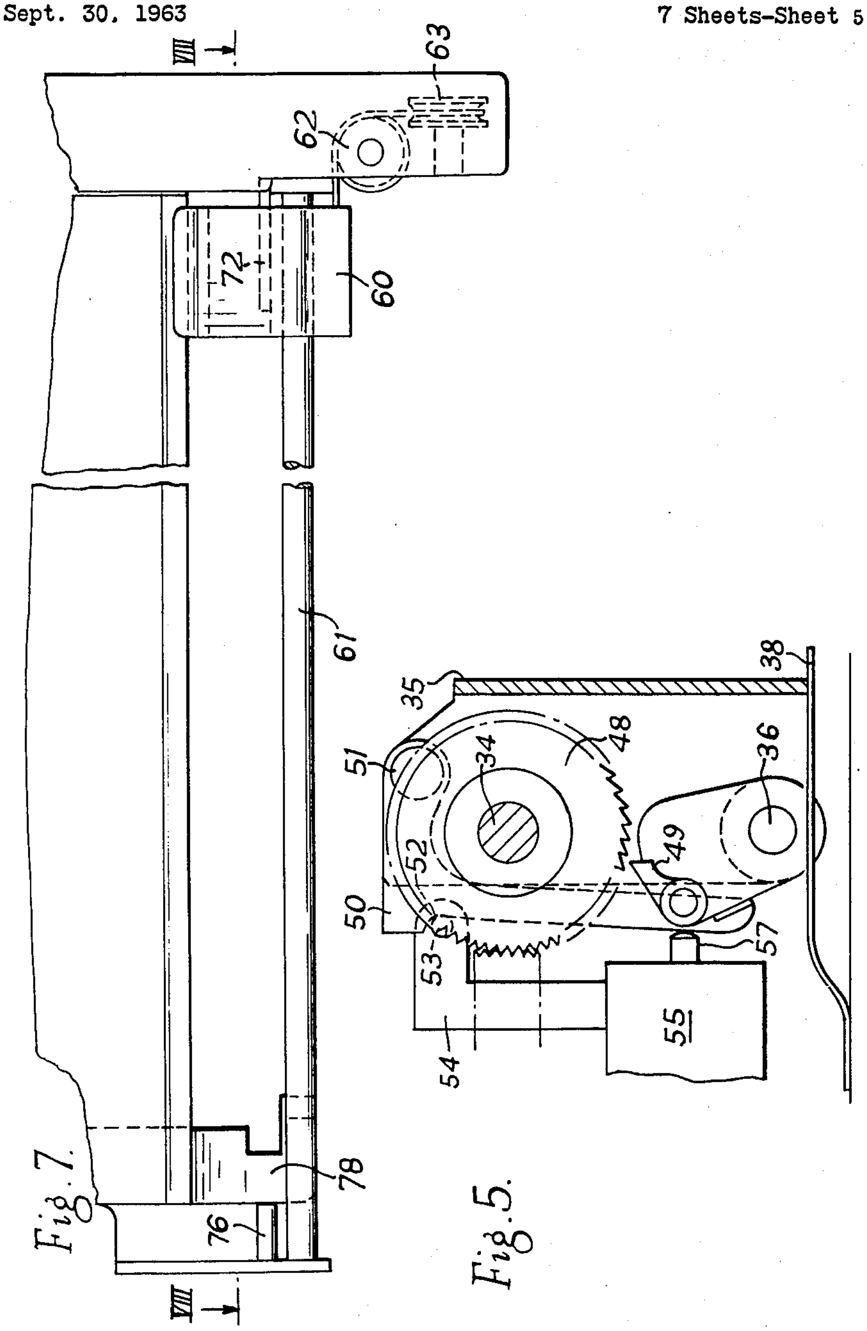
Figure 6:
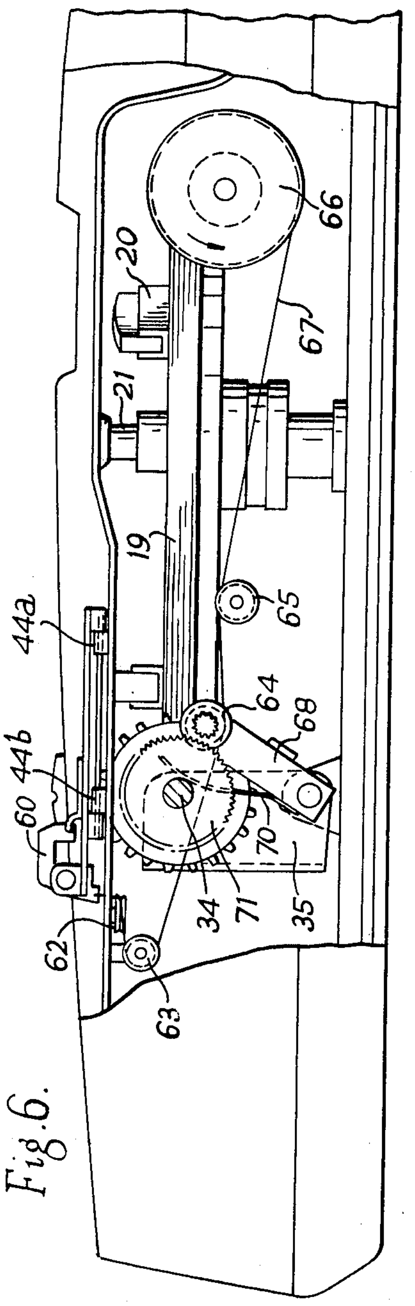
Figure 8:
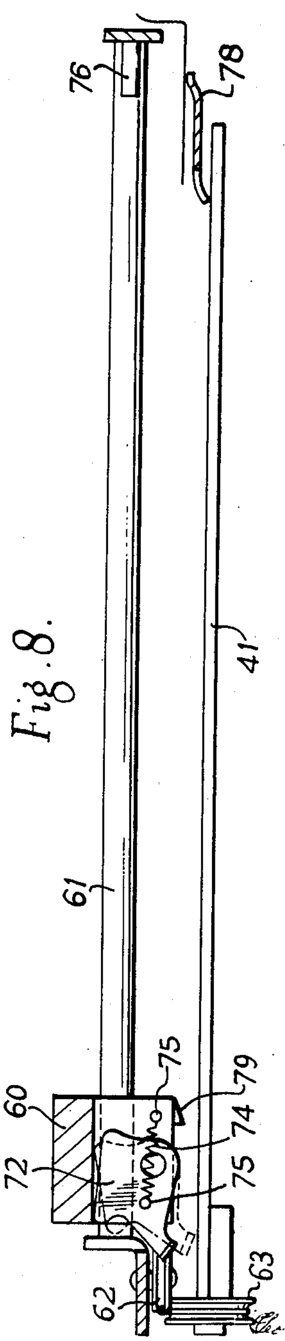
Figure 9:
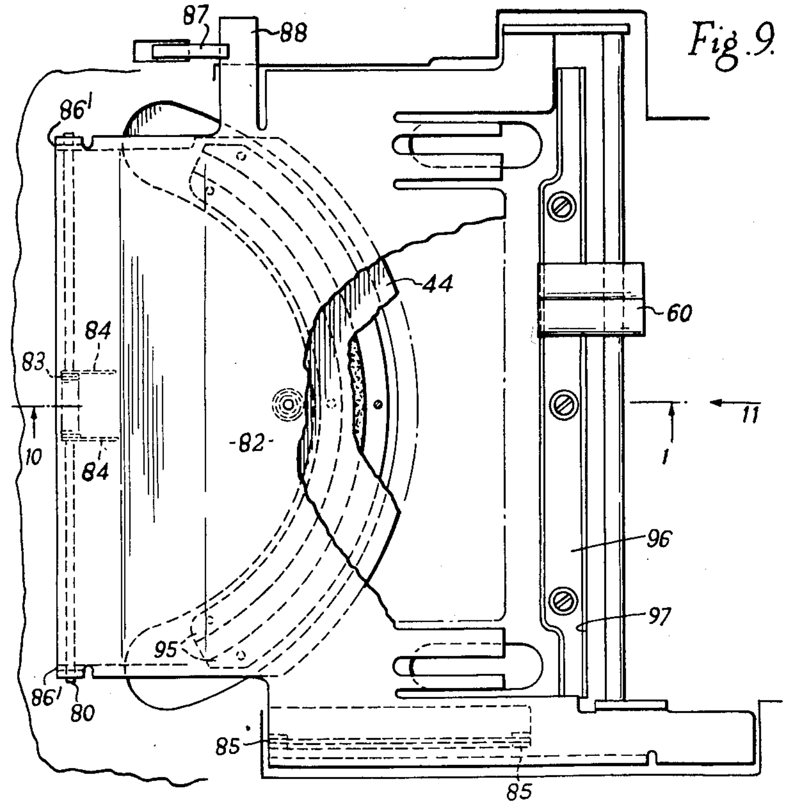
Figure 10:
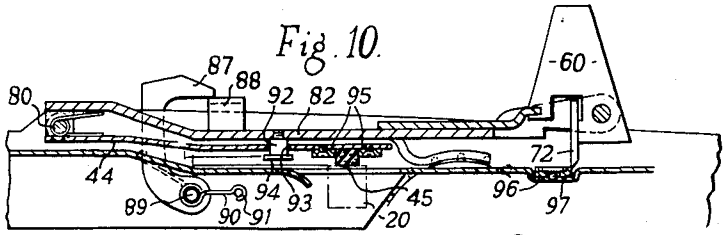
Figure 11:
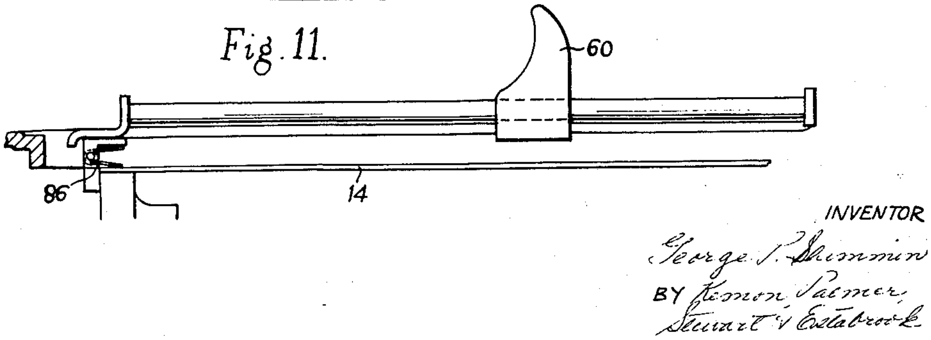

An example of the invention will now be described with reference to the accompanying drawings in which:

FIG. 1 is a perspective view of a magnetic recording and reproducing apparatus according to the invention, FIG. 2 is a diagram in plan of a recording head platform included in the apparatus of FIG. 1 and a band of recording medium having a series of arcuate tracks on which recording has been effected, FIG. 3 is a diagram in plan of the apparatus shown in FIG. 1, FIG. 4 is a sectional elevation along the staggered line 4—4 of FIG. 3, FIG. 5 is a detailed sectional elevation along the line 5—5 showing part of a back-spacing device included in the apparatus of FIG. 1, FIG. 6 is a sectional elevation of a knife included in the apparatus of FIG. 1 for cutting the tape shown in FIG. 2, FIGS. 7 and 8 are views in plan and elevation respectively of a cutting head and guide included in the knife of FIG. 6, FIG. 9 is a plan view of an alternative arrangement of part of the apparatus of FIG. 1, FIG. 10 is a view in cross-section along the line 10—10 of FIG. 9 and FIG. 11 is an elevation seen in the direction of the arrow 11 in FIG. 10.

Referring to FIGS. 1, 2, 3 and 4, apparatus for use in recording and reproducing sound has a framework including a base plate 10 having feet 11 and two side walls 12 each having a shoulder 13. A supporting plate 14 is secured between the side walls 12 and has a substantially semi-circular recess 15, a first horizontal portion 16 at a first level and a second horizontal portion 17 at a second level joined to the first portion by a ramp 18.

Beneath the supporting plate 14 a platform 19 carrying three magnetic recording and reproducing heads 20 on its upper surface is mounted on a spindle 21 journalled in the base plate 10.

The platform 19 is arranged for rotation in a horizontal plane and the heads 20 are angularly spaced equally from each other about the axis of rotation by $360°/n$. The platform 19 is of non-magnetic material and is about one quarter of an inch thick.

A drive spindle 22 is journalled in an arm 23 pivotally mounted by means of a pin 24 on the base plate 10. The arm has a lug 25 to which a bias spring 26 is connected, the other end of the spring 26 being anchored to the base plate 10 in order to bias the arm 23 in a manner such as to urge the drive spindle 22 into contact with a drive surface 27 of the platform 19. The drive spindle 22 also carries a disc 28 having an upstanding ring 29 of resilient material, preferably rubber, on its upper surface. A motor 30 is secured to the base plate 10 and has its output shaft 31 in firm contact with the upstanding ring 29 and is thus able to drive the platform 19 through the disc 28, drive spindle 22 and the drive surface 27 of the platform 19.

The edge of the platform 19 is provided with a worm 32 which engages the teeth of a worm wheel 33 mounted on a spindle 34 journalled in a bracket 35. The bracket 35 is itself pivotally mounted on a shaft 36 mounted in upstanding tabs 37 (only one of which shown in FIG. 4), the bracket being biased towards the platform 19 by means of a leaf spring 38, rivted to the base plate 10. The teeth of the worm wheel 33 are thus biased into engagement with the worm 32, and rotation of the platform 19 is accompanied by rotation of the shaft 34.

Two sprocket wheels 39 and 40 are fixedly mounted on the worm wheel shaft 34 and the sprocket teeth protrude upwardly through slots in the supporting plate 14 to provide a pulling drive for a band 41 of recording medium fed over the supporting plate 14 and having corresponding sprocket holes along each edge to be engaged by the sprocket teeth. The band 41 of recording medium is fed from a supply reel 42 accommodated in the recess 15 and passes over the upper portion 16 of the supporting plate, down the ramp 18 and over the lower portion 17 of the supporting plate to the sprocket wheels 39 and 40.

An arcuate slot 43 is provided in the lower portion 17 of the supporting plate 14 (FIG. 3), the slot 43 being slightly in excess of 120° in extent and its centre of curvature being coincident with the axis of rotation of the platform spindle 21. The heads 20 are so positioned upon the platform 19 that upon rotation of the platform 19 by the motor 30 the heads 20 run along the arcuate slot in succession, the gaps in their upper surfaces standing just proud of the upper surface of the lower portion 17 of the supporting plate 14.

A pressure plate 44 is hinged by means of hinges 44*a* and 44*b* to one of the side walls 12 and can be swung downwardly to cover the arcuate slot 43. The pressure plate 44 has an arcuate pressure pad 45 corresponding to the arcuate slot 43 but slightly shorter in extent fixed to its under surface which can be brought to bear upon the region of the band 41 of recording medium extending over the arcuate slot 43.

The difference in height between the upper and lower portions 16 and 17 of the supporting plate 14 is made such that as each head 20 is progressively moved from under the region of the band 41 pressed downwardly by the pressure pad 45, the head is progressively taken out of engagement with the band until sufficiently clear to pass under the upper portion 16 of the supporting plate 14. Similarly as the head approaches the arcuate slot 43 once more, the head is brought progressively into engagement with the band. Since the heads are out of engagement with the band 41 except when passing along the arcuate slot 43, no recording or reproduction can be performed by any of the heads except when passing along the slot 43. Further, the progressive engagement of each of the heads 20 with the band 41 is accompanied by the progressive disengagement of the preceding head from the band 41 whereby a smooth change-over between successive heads is effected. It has been found that no audible effect of the change-over is apparent in the reproducd signals.

FIG. 2 shows the manner in which recording is effected along a series of arcuate tracks by the three recording heads 20 as the platform 19 is rotated and the band 41 is pulled over the arcuate slot 43 by means of the sprocket wheels 39 and 40.

Two generally circular knobs 46 are fixedly mounted upon the worm wheel shaft 34 and are arranged to protrude upwardly through two slots 47 in the side walls 12. The length of each slot 47 is greater than the diameter of its corresponding knob 46 in order to allow the bracket 35 to be manually pivoted by means of the knobs 46 away from the platform 19 in order to disengage the worm wheel 33 from the worm 32 on the platform 19 whereupon movement of the band 41 can be brought about by rotating the knobs 46. Thus the band 41 can be manuallly drawn over the slot 43 from the supply reel 42 and its position adjusted in a simple and efficient manner.

Also fixedly mounted on the worm wheel shaft 34 is a ratchet wheel 48 having a co-operating pawl 49 pivotally mounted on the shaft 36 as shown best in FIG. 5. An actuating arm 50 is pivotally mounted, by means of a pin 51, on the bracket 35 and has a shoulder 52 in engagement with a stud 53 fixedly mounted on a support 54. A solenoid 55 having an actuating switch 56 (FIG. 1) is provided with a plunger 57 in line with the arm 51, the arrangement being such that upon operation of the solenoid by means of the switch 56 the plunger moves from left to right, as seen in FIG. 5, moving the lower part of the arm 51 from the left to right. The movement of the lower half of the arm 51 causes the arm 51 to pivot about the stud 53, which in turn causes the bracket 35 to pivot about its shaft 36 disengaging the worm wheel 33 from the worm 32. The solenoid plunger 57 is also arranged to move the pawl 49 into engagement with the ratchet wheel 48, the pawl 49 striking the ratchet wheel only after the worm wheel 33 is clear of the worm 32. Continued movement of the solenoid plunger 57 causes the pawl 49 to rotate the ratchet wheeel 48 and shaft 34 in a sense such as to cause the band 41 to move in the reverse direction, that is towards the suppy reel 42. Each operation of the solenoid 55 causes the band 41 to step back by a predetermined amount which is made equal to the distance between one or more successive tracks on the band 41.

Referring to FIGS. 3, 4, 6, 7 and 8, the hinged pressure plate 44 has an extension plate 58 secured to its upper surface, the extension plate having a lip 59 extending therefrom. A cutting head 60, in the general form of an inverted U, has a slot formed in one of its limbs engaging the lip 59, whereby the lip 59 acts as a slide for the cutting head 60. The cutting head 60 is provided with a further slide in the form of a rod 61 passing through a hole in the other limb of the head 60, whereby the cutting head can slide transversely of the band 41 of recording medium on its two slides.

Two pulleys 62 and 63 are arranged to rotate about axes mutually perpendicular to one another. Arranged in line with pulley 63 are two further pulleys 64 and 65 and a spring-loaded take-up reel 66. A cord 67 is secured at one of its ends to the cutting head 60 and at its other end to the take-up reel 66 whereby transverse movement of the cutting head 60 away from the pulleys 62 and 63 causes the cord to tighten and to pass over the pulleys from the take-up reel 66. Reverse movement of the cutting head 60 causes the cord 67 to slacken and be taken up by the reel 66.

The pulley 64 is pivotally mounted on a spring-loaded arm 68 and has a pinion 69 fixedly secured thereto. The arm 68 is spring-loaded by means of a leaf spring 70 in a manner such as to urge the pinion 69 out of engagement with a gear wheel 71 in line therewith and fixedly secured to the worm wheel shaft 34. Thus movement of the cutting head 60 away from the pulleys 62 and 63 causes the arm 68 to move against the bias of the spring 70 to bring the pinion 69 into engagement with the gear wheel 71. The passage of the cord 67 over the pulley 64 causes rotation of the pinion 69 and gear wheel 71 and movement of the band 41 in the forward direction.

The cutting head 60 has a blade 72 pivotally mounted on the inner face of one of its limbs by means of a pin 73. A spring 74 is secured to the blade 72 at one end and to the said inner face at the other of its ends by means of pins 75, all the pins 73 and 75 being arranged in line in a manner such that the blade has two stable positions, both of which are shown in FIG. 8, one in full lines and the other in broken lines.

When it is required to cut the band 41 following a recording, the cutting head 60 is drawn transversely from the pulleys 62 and 63 with the blade 72 clear of the band 41 as shown in full lines in FIG. 8. This action pulls the band 41 forward, through the intermediary of the cord 67, pulley 64, pinion 69, gear wheel 71 and sprockets 39 and 40, by an amount sufficient to ensure that the band 41 is not severed through one of the tracks recorded thereon. When the cutting head has reached its extreme position remote from the pulleys 62 and 63 the blade 72 strikes a short rod 76 causing the blade 72 to pivot to the stable state in which it bears upon the band 41 as shown in broken lines in FIG. 8. Subsequent reverse movement of the cutting head 60 causes the blade 72 to cut the band 41, the band 41 remaining stationary because of the disengagement of the pinion 69 and the gear wheel 71 following the slackening of the cord 67. The return of the cutting head 60 to its initial position causes the blade 72 to strike an upstanding tab 77 and to revert to the stable position in which it is clear of the band 41.

The cutting head 60 can be locked in its extreme position remote from the pulleys 62 and 63 by means of a leaf spring 78 arranged to snap into engagement with a lip 79 formed on the underside of the cutting head 60 when the cutting head 60 has reached its extreme position.

To make a recording the pressure plate 44 and pad 45 are hinged clear of the upper surface of the supporting plate 14 together with the cutting head 60 and associated slides. A band of recording medium is placed in position over the supporting plate 14 with the sprocket teeth engaging the sprocket holes in the edges of the band. The pressure plate 44 is lowered into position to apply pressure by way of the pad 45 to the region of the band extending over the arcuate slot 43. The motor 30 is switched on and audio frequency signals to be recorded are applied to the heads 20 by way of slip rings 80 on the platform spindle 21. The heads 20 can be switched on, by means of a cam-operated switch for example, in such a manner that each becomes operative as it moves into the arcuate slot 43. It has been found, however, that by using the ramp 18 in the supporting plate 14 and, if necessary, bevelling the edge of the pressure pad 45 nearest the ramp 18, the need to switch the heads 20 can be avoided. Thus the heads can merely be connected in series with one another.

Referring now to FIGS. 9, 10 and 11, in a modification of the recording and reproducing apparatus the pressure plate 44 is pivotally mounted for rotation about a rod 80 extending perpendicular to the direction of movement of the band 41 of recording medium and along one edge of the pressure plate 44. The transverse rod 80 is secured at each end to a mounting plate 82 covering the pressure plate 44, a coil spring 83 encircling the transverse rod 80 and having its ends 84 biased away from each other to urge the pressure plate 44 downwardly away from the mounting plate 82. The mounting plate 82 is itself hinged at one edge by means of two hinges 85, the mounting plate 82 being biased in an upward direction by means of a coil spring 86 (FIG. 11). A catch 87 is provided for securing the mounting plate 82 in a horizontal position, the catch being arranged to hook over a double-cranked tongue 88 extending from the edge of the mounting plate 82 opposite the hinged edge thereof. The catch 87 is pivoted about a pivot 89 and includes a coil spring 90 having one end anchored to a pin 91 and the other anchored to the body of the catch 87, to urge the catch in a direction to hook over the tongue 88.

The pressure plate 44 is pivotally mounted on the transverse rod 80 by means of two upstanding lugs 86' the rod 80 extending through an aperture in each lug 86'. The rod 80 is arranged to be a loose fit in the aperture of each lug 86' whereby the pressure plate 44 can tilt in a manner such that each side edge of the pressurer plate 44 moves independently of the other. Thus, when two heads 20 are in contact with the band 41 simultaneously, movement of the pressure plate 44 in response to the upward force applied to the band 41 by one of the heads 20 has no effect on the force applied to the band 41 by the other head 20.

The reason for resiliently mounting the pressure plate 44 and arranging for the plate 44 to be able to tilt, is to ensure a more gently progressive engagement with the band 41 and disengagement from the band 41 of each head 20. The change-over between successive heads 20 is thus effected more smoothly than when the pressure plate 44 is rigidly secured.

In order to limit the movement of the pressure plate 44 from the mounting plate 82 upon releasing the catch 87 and swinging the mounting plate 82 upwardly to expose the band 41, a stop 92 having a threaded extension is screwed into the mounting plate 82 from its underside. The stop extends through an aperture 93 in the pressure plate 44 and has a collar 94 against which the pressure plate 44 presses at the limit of its travel from the mounting plate 82.

The modification of the recording and reproducing apparatus shown in FIGS. 9, 10 and 11 also includes two arcuate flanking strips 95 between which the pressure pad 45 is sandwiched, the flanking strips being screwed to the underside of the pressure plate 44 and being attached to the pressure pad 45 whereby the pressure pad 45 is secured more firmly to the pressure plate 44 than in the absence of the flanking strip. Also, the cutting head 60 is formed with an upstanding, hooked extension serving as a handle with which the cutting head 60 can be drawn over the band 41 to cut the band and a cutting block 96 is screwed into a recess 97 formed in the supporting plate 14, the upper edge of the cutting block supporting the band 41 clear of the supporting plate 14 to allow the blade 72 of the head 60 to cut the band 41. The cutting edge of the blade 72 is thus kept clear of the supporting plate 14 avoiding damage to the cutting edge.

The use of sprockets for feeding the band 41 over the heads 20 determines the position of each arcuate track traversing the band 41. Thus location of the band 41 in the apparatus, or like apparatus, for reproducing recorded signals is automatically effected when the sprocket teeth are located in the sprocket holes. Furthermore back-spacing or adjustment of the band 41 to any given arcuate track is facilitated. Finally, the spacing of the sprocket teeth of the wheel 39 from the side wall 12 immediately adjacent thereto is preferably made different from the spacing of the sprocket teeth of the wheel 40 from the other side wall 12 immediately adjacent thereto, as shown in FIG. 3, the spacing of the sprocket holes on each side of the band 41 being correspondingly spaced from the edge of the band immediately adjacent thereto. In this way the band 41 cannot inadvertently be placed in the apparatus, for the reproduction of recorded signals in such a way that the band 41 moves in the opposite direction to that during recording. In addition or alternatively the spacing between consecutive ones of the teeth on the wheel 39 can be made different from the spacing between consecutive ones of the teeth on the wheel 40, the sprocket holes in each edge of the band 41 being spaced to match.

In providing a step-by-step feed by which the band is stepped forward at the beginning or end of each arcuate recording to producing traverse, the head platform can, for example, have three cam surfaces each of 120° in extent spaced around its periphery. The cam surfaces can be of progressively increasing radius or height terminating in a sharp step to the beginning of the next cam surface. A cam follower co-operating with the cam surfaces can be used to store energy in a spring which is released at each return step and used to move the band rapidly into position for the next traverse.

As the cam surfaces are fixed in relation to the angular positions of the head, the positions of the arcuate tracks along the band are again made invariable by employing a suitable drive such as the sprocket drive already described.

I claim:

1. Apparatus for recording sound along a series of arcuate tracks on a band of recording medium comprising a plurality of magnetic recording heads, a rotatable carrier device to support said heads and effective to rotate said heads in a common plane about a common axis of rotation, said heads being equally spaced angularly about the said axis, a slotted band-supporting plate, a first portion of said plate being inclined to said plane of rotation and a flat second portion of said plate joining said first portion and lying in a plane generally parallel to said plane of rotation, and an arcuate slot in said second portion with its extremities extending into said first portion of said plate, and drive mechanism to draw said band over one surface of said plate and over said slot, said carrier device being effective to cause said heads in turn to progressively enter said arcuate slot at one extremity thereof to engage the band and after traversing the band to progressively withdraw from the slot at the other extremity to disengage from the band.

2. Apparatus for recording sound along a series of arcuate tracks on a band of recording medium having sprocket holes spaced therealong comprising a platform rotatable about an axis, a plurality of magnetic heads mounted on said platform and equally spaced angularly bout said axis, said platform being effective to rotate said heads in a common plane about said axis and band-feeding mechanism to draw said band past said heads in a plane parallel to said plane of rotation, said band-feeding mechanism comprising a cylindrical outer surface on said platform shaped to define a worm on said outer surface, a shaft parallel to said plane of rotation and perpendicular to the direction of motion of said band, a worm-wheel mounted on said shaft, the teeth of said worm-wheel engaging said worm, and at least one sprocket mounted on said shaft to engage the sprocket holes in said band to apply traction to said band.

3. Apparatus according to claim 2 wherein said band-feeding mechanism includes supporting means supporting said shaft for rotation about its longitudinal axis and about an axis spaced therefrom and parallel to said longitudinal axis to allow the teeth of said worm-wheel to move out of engagement with said worm and biasing means to urge said shaft in a direction to bring the teeth of said worm-wheel into engagement with said worm.

4. Apparatus according to claim 3 wherein the band-feeding mechanism includes a rachet wheel fixedly mounted on said shaft, a pawl to rotate said ratchet wheel and means operable to rotate said shaft to disengage said worm-wheel from said worm against the action of said biasing means and subsequently to actuate said pawl to turn said ratchet wheel by a predetermined amount in a direction opposite to that during recording.

5. Apparatus for recording sound along a series of arcuate slots on a band of recording medium comprising a plurality of magnetic recording heads, a rotatable carrier device to support said heads and effective to rotate said heads in a common plane about a common axis of rotation, said heads being equally spaced angularly about the said axis, a slotted band-supporting plate, a first portion of said plate being inclined to said plane of rotation and a flat second portion of said plate joining said first portion and lying in a plane generally parallel to said plane of rotation, and an arcuate slot in said second portion with its extremities extending into said first portion of said plate, and drive mechanism to draw said band over one surface of said plate and over said slot in a direction to pass over said first portion of said plate before passing over said second portion of said plate, said carrier device being effective to cause said heads in turn to progressively enter said arcuate slot at one extremity thereof to engage the band and after traversing the band to progressively withdraw from the slot at the other extremity to disengage from the band.

6. Apparatus for recording sound along a series of arcuate tracks on a band of recording medium comprising a plurality of magnetic recording heads, a rotatable carrier device to support said heads and effective to rotate said heads in a common plane about a common axis of rotation, said heads being equally spaced angularly about the said axis, a slotted band-supporting plate, a first portion of said plate constituting a ramp inclined to said plane of rotation, a flat second portion of said plate lying in a plane generally parallel to said plane of rotation, a flat third portion of said plate lying in a plane generally parallel to said plane of rotation but spaced from the general plane of said second portion, said ramp interconnecting said second and third portions of said plate, and an arcuate slot in said second portion of which the extremities extend into said ramp, and drive mechanism to draw said band over one surface of said plate and over said slot, said carrier device being effective to cause said heads in turn to progressively enter said arcuate slot at one extremity thereof to engage the band and after traversing the band to progressively withdraw from the slot at the other extremity to disengage from the band.

7. Apparatus for recording sound along a series of arcuate tracks on a band of recording medium having sprocket holes spaced therealong comprising a plurality of magnetic recording heads, a rotatable platform carrying said heads and effective to rotate said heads in a common plane about a common axis of rotation, said heads being equally spaced angularly about the said axis, a slotted band-supporting plate, a first portion of said plate being inclined to said plane of rotation and a flat second portion of said plate joining said first portion and lying in a plane generally parallel to said plane of rotation, and in arcuate slot in said second portion with its extremities extending into said first portion of said plate, and drive mechanism to draw said band over one surface of said plate and over said arcuate slot, said platform being effective to cause said heads in turn to progressively enter said arcuate slot at one extremity thereof to engage the band and after traversing the band to progressively withdraw from the slot at the other extremity thereof to disengage from the band, said drive mechanism including a cylindrical outer surface on said platform shaped to define a worm on said outer surface, a shaft parallel to said plane of rotation and perpendicular to the direction of motion of said band, a worm-wheel mounted on said shaft, the teeth of said worm-wheel engaging said worm, and at least one sprocket mounted on said shaft to engage the sprocket holes in said band to apply traction to said band.

8. Apparatus according to claim 7 wherein said drive mechanism includes supporting means to support said shaft for rotation about its longitudinal axis and about an axis spaced therefrom and parallel to said longitudinal axis to allow the teeth of said worm-wheel to move out of engagement with said worm and biasing means to urge said shaft in a direction to bring the teeth of said worm-wheel into engagement with said worm.

9. Apparatus according to claim 8 wherein said band-feeding mechanism includes a ratchet wheel fixedly mounted on said shaft, a pawl to rotate said ratchet wheel and means operable to rotate said shaft to disengage said worm-wheel from said worm against the action of said biasing means and subsequently to actuate said pawl to turn said ratchet wheel by a predetermined amount in a direction opposite to that during recording.

10. Apparatus for recording sound on a band of recording medium comprising a plurality of magnetic recording heads, a band-supporting plate, drive mechanism to cause movement of said heads transversely relative to said band and to cause longitudinal movement of said band over said plate, a knife, a guide for said knife, said knife being mounted on said guide for movement transverse relative to said band, limiting means to limit movement of said knife between two limiting positions, a blade included in said knife having two stable states, in one of which said blade is clear of said plate to prevent cutting of said band and in the other of which said blade engages said band to enable said blade to cut said band, and means to cause said blade to adopt said one stable position whenever said knife is in one of said limiting positions and to cause said blade to adopt said other stable position whenever said knife is in said other limiting position.

11. Apparatus according to claim 10 wherein means are provided coupling said knife to said drive mechanism to cause said drive mechanism to move said band by a predetermined amount in the same directions as during recording as said knife moves from said one limiting position to said other limiting position.

12. Apparatus for recording sound along a series of arcuate tracks on a band of recording medium comprising a plurality of magnetic recording heads, a rotatable carrier device to support said heads and effective to rotate said heads in a common plane about a common axis of rotation, said heads being equally spaced angularly about said axis, a slotted band-supporting plate, a first portion of said plate being inclined to said plane of rotation and a flat second portion of said plate joining said first portion and lying in a plane generally parallel to said plane of rotation, and an arcuate slot in said second portion with its extremities extending into said first portion, drive mechanism to draw said band over one surface of said plate and over said arcuate slot, said carrier device being effective to cause said heads in turn to progressively enter said arcuate slot at one extremity thereof to engage the band and after traversing the band to progressively withdraw from the slot at the other extremity to disengage from the band, a knife, a guide for said knife, said knife being mounted on said guide for movement transverse relative to said band, limiting means to limit movement of said knife between two limiting positions, a blade including in said knife having two stable states, in one of which said blade is clear of said plate to prevent cutting of said band and in the other of which said blade engages said plate to enable said blade to cut said band, and means to cause said blade to adopt said one position whenever said knife is in one of its limiting positions and to cause said blade to adopt said other stable position whenever said knife is in said other limiting position.

13. Apparatus for recording sound according to claim 12 wherein means are provided coupling said knife to said drive mechanism to cause said drive mechanism to move said band by a predetermined amount in the same direction as during recording as said knife moves from said one limiting position to said other limiting position.

14. Apparatus for recording sound along a series of arcuate tracks on a band of recording medium having sprocket holes spaced therealong comprising a platform rotatable about an axis, a plurality of magnetic heads mounted on said platform and equally spaced angularly about said axis, said platform being effective to rotate said heads in a common plane about said axis, band-feeding mechanism to draw said band past said heads in a plane parallel to said plane of rotation, said band-feeding mechanism comprising a cylindrical outer surface on said platform shaped to define a worm on said outer surface, a shaft parallel to said plane of rotation and perpendicular to the direction of motion of said band, a worm-wheel mounted on said shaft, the teeth of said worm-wheel engaging said worm, and at least one sprocket mounted on said shaft to engage the sprocket holes in said band to apply traction to said band, a knife, a guide for said knife, said knife being mounted on said guide for movement transverse relative to said band, limiting means to limit movement of said knife between two limiting positions, a blade included in said knife having two stable states, in one of which said blade is clear of said plate to prevent cutting of said band and in the other of which said blade engages said plate to enable said blade to cut said band, and means to cause said blade to adopt said stable position whenever said knife is in one of said limiting positions and to cause said blade to adopt said other stable position whenever said knife is in said other limiting position.

15. Apparatus according to claim 14 wherein means are provided coupling said knife to said drive mechanism to cause said drive mechanism to move said band by a predetermined amount in the same direction as during recording as said knife moves from said one limiting position to said other limiting position.

16. Apparatus according to claim 14 wherein said band-feeding mechanism includes supporting means supporting said shaft for rotation about its longitudinal axis and about an axis spaced therefrom and parallel to said longitudinal axis to allow the teeth of said worm-wheel to move out of engagement with said worm and biasing means to urge said shaft in a direction to bring the teeth of said worm-wheel into engagement with said worm.

17. Apparatus according to claim 16 wherein said band-feeding mechanism includes a ratchet wheel fixedly mounted on said shaft, a pawl to rotate said ratchet wheel and means operable to rotate said shaft to disengage said worm-wheel from said worm against the action of said biasing means and subsequently to actuate said pawl to turn said ratchet wheel by a predetermined amount in a direction opposite to that during recording.

18. Apparatus for recording sound along a series of arcuate tracks on a band of recording medium comprising a plurality of magnetic recording heads, a rotatable carrier device to support said heads and effective to rotate said heads in a common plane about a common axis of rotation, said heads being equally spaced angularly about the said axis, a slotted band-supporting plate, a first portion of said plate constituting a ramp inclined to said plane of rotation, a flat second portion of said plate lying in a plane generally parallel to said plane of rotation, a flat third portion of said plate lying in a plane generally parallel to said plane of rotation but spaced from the genera plane of said second portion, said ramp interconnecting said second and third portions of said plate, an arcuate slot in said second portion of which the extremities extend into said ramp, drive mechanism to draw the band over one surface of said plate and over said slot, said carrier device being effective to cause said heads in turn to progressively enter said arcuate slot at one extremity to engage the band and after traversing the band to progressively withdraw from said slot at the other extremity thereof to disengage from said band, a knife, a guide for said knife, said knife being mounted on said guide for movement transverse relative to said band, limiting means to limit movement of said knife between two limiting positions, a blade included in said knife having two stable states, in one of which said blade is clear of said plate to prevent cutting of said band and in the other of which said blade engages said band to enable said blade to cut said band, and means to cause said blade to adopt said one stable position whenever said knife is in one of said limiting positions and to cause said blade to adopt said other stable position whenever said knife is in said other limiting position.

19. Apparatus for recording sound along a series of arcuate tracks on a band of recording medium having sprocket holes spaced therealong comprising a platform rotatable about an axis, a plurality of magnetic heads mounted on said platform and equally angularly spaced about said axis, said platform being effective to rotate said heads in a common plane about said axis, a slotted band supporting plate, a first portion of said plate constituting a ramp inclined to said plane of rotation, a flat second portion of said plate lying in a plane generally parallel to said plane of rotation, a flat third portion of said plate lying in a plane generally parallel to said plane of rotation but spaced from the plane of said second portion, said ramp interconnecting said second and third portions of said plate, an arcuate slot in said second portion of which the extremities extend into said ramp, drive mechanism to draw said band over one surface of said plate and over said slot in a direction to pass over said first portion of said plate before passing over said ramp and said second portion of said plate, said platform being effective to cause said heads in turn to progressively enter said arcuate slot at one extremity thereof to engage the band and after traversing the band to progressively withdraw from said slot at the other extremity thereof to disengage from the band, said drive mechanism including a cylindrical outer surface on said platform shaped to define a worm on said outer surface, a shaft parallel to said plane of rotation and perpendicular to the direction of motion of said band, a worm-wheel mounted on said shaft to allow the teeth of said worm-wheel to engage said worm, at least one sprocket mounted on said shaft to engage the sprocket holes in said band to apply traction to said band, supporting means to support said shaft for rotation about its longitudinal axis and about an axis spaced therefrom and parallel to said longitudinal axis to allow the teeth of said worm-wheel to move out of engagement with said worm, biasing means to urge said shaft in a direction to bring the teeth of said worm-wheel into engagement with said worm, a ratchet wheel fixedly mounted on said shaft, a pawl to rotate said ratchet wheel, means to rotate said shaft to disengage said worm-wheel from said worm against the action of said biasing means and subsequently to actuate said pawl to rotate said ratchet wheel by a predetermined amount in a direction opposite to that during recording, a knife, a guide for said knife, said knife being mounted on said guide for movement transverse relative to said band, limiting means to limit movement of said knife between two limiting positions, a blade included in said knife having two stable states, in one of which said blade is clear of said plate to prevent cutting of said band and in the other of which said blade engages said plate to enable said blade to cut said band, means to cause said blade to adopt said one stable position whenever said knife is in one of said limiting positions and to cause said blade to adopt said other stable position whenever said knife is in said other limiting position, and means coupling said knife to said drive mechanism to cause said drive mechanism to move said band by a predetermined amount in the same direction as during recording as said knife moves from said one limiting position to said other limiting position.

20. Apparatus for recording sound on a band of recording medium comprising a plurality of magnetic recording heads, a rotatable carrier device to support said heads and effective to rotate said head in a common plane about a common axis of rotation, said heads being equally spaced angularly about the said axis, a slotted band-supporting plate, a first portion of said plate being inclined to said plane of rotation and a flat second portion of said plate joining said first portion and lying in a plane generally parallel to said plane of rotation, and an arcuate slot in said second portion with its extremities extending into said first portion of said plate, and drive mechanism to draw said band over one surface of said plate and over said slot, said carrier device being effective to cause said heads in turn to progressively enter said arcuate slot at one extremity thereof to engage the band and after traversing the band to progressively withdraw from the slot at the other extremity to disengage from the band, a support, a resilient pressure pad mounted on said support, said support being movable substantially normally relative to said flat second portion of said band-supporting plate to carry said resilient pad into a position overlying said slot, biasing means to urge said support to bring the resilient pad into engagement with said band, said support being mounted to tilt allowing the pad to move at one of its ends independently of movement of the pad at the other of its ends.

21. Apparatus according to claim 20 including a mounting plate covering the pressure plate and pivotally mounted on the band-supporting plate for rotation about an axis parallel to the direction of motion of the band, the biasing means comprising a spring urging the pressure plate and the mounting plate apart, and a catch for locking the mounting plate in a position to cause the pressure plate to hold the pressure pad in engagement with the band.

22. Apparatus for recording sound along a series of arcuate tracks on a band of recording medium having sprocket holes spaced therealong comprising a platform rotatable about an axis, a plurality of magnetic heads mounted on said platform and equally angularly spaced about said axis, said platform being effective to rotate said heads in a common plane about said axis, a slotted band supporting plate, a first portion of said plate constituting a ramp inclined to said plane of rotation, a flat second portion of said plate lying in a plane generally parallel to said plane of rotation, a flat third portion of said plate lying in a plane generally parallel to said plane of rotation but spaced from the plane of said second portion, said ramp interconnecting said second and third portions of said plate, an arcuate slot in said second portion of which the extremities extend into said ramp, drive mechanism to draw said band over one surface of said plate and over said slot in a direction to pass over said first portion of said plate before passing over said ramp and said second portion of said plate, said platform being effective to cause said heads in turn to progressively enter said arcuate slot at one extremity thereof to engage the band and after traversing the band to progressively withdraw from said slot at the other extremity thereof to disengage from the band, said drive mechanism including a cylindrical outer surface on said platform shaped to define a worm on said outer surface, a shaft parallel to said plane of rotation and perpendicular to the direction of motion of said band, a worm-wheel mounted on said shaft to allow the teeth of said worm-wheel to engage said worm, at least one sprocket mounted on said shaft to engage the sprocket holes in said band to apply traction to said band, supporting means to support said shaft for rotation about its longitudinal axis and about an axis spaced therefrom and parallel to said longitudinal axis to allow the teeth of said worm-wheel to move out of engagement with said worm, biasing means to urge said shaft in a direction to bring the teeth of said worm-wheel into engagement with said worm, a ratchet wheel fixedly mounted on said shaft, a pawl to rotate said ratchet wheel, means to rotate said shaft to disengage said worm-wheel from said worm against the action of said biasing means and subsequently to actuate said pawl to rotate said ratchet wheel by a predetermined amount in a direction opposite to that during recording, a knife, a guide for said knife, said knife being mounted on said guide for movement transverse relative to said band, limiting means to limit movement of said knife between two limiting positions, a blade included in said knife having two stable states, in one of which said blade is clear of said plate to prevent cutting of said band and in the other of which said blade engages said plate to enable said blade to cut said band, means to cause said blade to adopt said one stable position whenever said knife is in one of said limiting positions and to cause said blade to adopt said other stable position whenever said knife is in said other limiting position, and means coupling said knife to said drive mechanism to cause said drive mechanism to move said band by a predetermined amount in the same direction as during recording as said knife moves from said one limiting position to said other limiting position, a support, a resilient pressure pad mounted on said support, said support being movable substantially normally relative to said flat second portion of said band-supporting plate to carry said resilient pad into a position overlying said slot, biasing means to urge said support to bring the resilient pad into engagement with said band, said support being mounted to tilt allowing the pad to move at one of its ends independently of movement of the pad at the other of its ends.

23. Apparatus for recording sound along a series of arcuate tracks as claimed in claim 22 including a mounting plate covering the pressure plate and pivotally mounted on the band-supporting plate for rotation about an axis parallel to the direction of motion of the band, the biasing means comprising a spring urging the pressure plate and the mounting plate apart, and a catch for locking the mounting plate in a position to cause the pressure plate to hold the pressure pad in engagement with the band.

24. Apparatus for recording sound along a plurality of arcuate tracks on a band of recording medium having sprocket holes spaced therealong comprising a platform rotatable about an axis, a plurality of magnetic heads mounted on said platform and equally spaced angularly about said axis, said platform being effective to rotate said heads in a common plane about said axis and band-feeding mechanism to draw said band past said heads in a plane parallel to said plane of rotation, said band-feeding mechanism comprising a cylindrical outer surface on said platform shaped to define a worm on said outer surface, a shaft parallel to said plane of rotation and perpendicular to the direction of motion of said band, a worm-wheel mounted on said shaft, the teeth of said worm-wheel engaging said worm, and a pair of sprockets mounted on said shaft intermediate two guides for guiding the lateral edges of the tape to bring a first row of the sprocket holes in the tape into engagement with one of the sprockets and a second row of the sprocket holes into engagement with the other of the sprockets, the spacing of the teeth of one sprocket from one guide being different from the spacing of the teeth of the other sprocket from the other guide.

25. Apparatus according to claim 24 wherein the spacing between successive teeth of one sprocket differs from the spacing between successive teeth of the other sprocket.

26. Apparatus for recording sound along a plurality of arcuate tracks on a band of recording medium having sprocket holes spaced therealong comprising a platform rotatable about an axis, a plurality of magnetic heads mounted on said platform and equally spaced angularly about said axis, said platform being effective to rotate said heads in a common plane about said axis and band-feeding mechanism to draw said band past said heads in a plane parallel to said plane of rotation, said band-feeding mechanism comprising a cylindrical outer surface on said platform shaped to define a worm on said outer surface, a shaft parallel to said plane of rotation and perpendicular to the direction of motion of said band, a worm-wheel mounted on said shaft, the teeth of said worm-wheel engaging said worm, and a pair of sprockets mounted on said shaft intermediate two guides for guiding the lateral edges of the tape to bring a first row of the sprocket holes in the tape into engagement with one of the sprockets and a second row of the sprocket holes into engagement with the other of the sprockets, the spacing between successive teeth of one sprocket differing from the spacing between successive teeth of the other sprocket.

27. Apparatus for recording sound along a plurality of arcuate tracks in turn on a band of recording medium having sprocket holes spaced therealong comprising a platform rotatable about an axis, a plurality of magnetic heads mounted on said platform and equally angularly spaced about said axis, said platform being effective to rotate said heads in a common plane about said axis, a slotted band supporting plate, a first portion of said plate constituting a ramp inclined to said plane of rotation, a flat second portion of said plate lying in a plane generally parallel to said plane of rotation, a flat third portion of said plate lying in a plane generally parallel to said plane of rotation but spaced from the plane of said second portion, said ramp interconnecting said second and third portions of said plate, an arcuate slot in said second portion of which the extremities extend into said ramp, drive mechanism to draw said band over one surface of said plate and over said slot in a direction to pass over said first portion of said plate before passing over said ramp and said second portion of said plate, said platform being effective to cause said heads in turn to progressively enter said arcuate slot at one extremity thereof to engage the band and after traversing the band to progressively withdraw from said slot at the other extremity thereof to disengage from the band, said drive mechanism including a cylindrical outer surface on said platform shaped to define a worm on said outer surface, a shaft parallel to said plane of rotation and perpendicular to the direction of motion of said band, a worm-wheel mounted on said shaft to allow the teeth of said worm-wheel to engage said worm, a pair of sprockets mounted on said shaft intermediate two guides for guiding the lateral edges of the tape to bring a first row of the sprocket holes into engagement with one of the sprockets and a second row of the sprocket holes into engagement with the other of the sprockets, the spacing of the teeth of one sprocket from one guide being different from the spacing of the teeth of the other sprocket from the other guide and the spacing between successive teeth of one sprocket being different from the spacing between successive teeth of the other sprocket, supporting means to support said shaft for rotation about its longitudinal axis and about an axis spaced therefrom and parallel to said longitudinal axis to allow the teeth of said worm-wheel to move out of engagement with said worm, biasing means to urge said shaft in a direction to bring the teeth of said worm-wheel into engagement with said worm, a ratchet wheel fixedly mounted on said shaft, a pawl to rotate said ratchet wheel, means to rotate said shaft to disengage said worm-wheel from said worm against the action of said biasing means and subsequently to actuate said pawl to rotate said ratchet wheel by a predetermined amount in a direction opposite to that during recording, a knife, a guide for said knife, said knife being mounted on said guide for movement transverse relative to said band, limiting means to limit movement of said knife between two limiting positions, a blade included in said knife having two stable states, in one of which said blade is clear of said plate to prevent cutting of said band and in the other of which said blade engages said plate to enable said blade to cut said band, means to cause said blade to adopt said one stable position whenever said knife is in one of said limiting positions and to cause said blade to adopt said other stable position whenever said knife is in said other limiting position, and means coupling said knife to said drive mechanism to cause said drive mechanism to move said band by a predetermined amount in the same direction as during recording as said knife moves from said one limiting position to said other limiting position.

References Cited by the Examiner

UNITED STATES PATENTS

| | | | |
|---|---|---|---|
| 2,326,332 | 8/1943 | Clausen | 179—100.2 |
| 2,772,328 | 11/1956 | Lyon | 179—100.2 |
| 3,124,360 | 3/1964 | Staar | 274—4.2 |

NORTON ANSHER, *Primary Examiner.*